FIG. I

INVENTOR.
WILLEM BAKKER
BY

ATTORNEY

May 16, 1967  W. BAKKER  3,319,409
METHOD AND DEVICE FOR SECURING YARN PACKAGES
Filed Aug. 11, 1964  8 Sheets-Sheet 5

INVENTOR.
WILLEM BAKKER
BY

ATTORNEY

INVENTOR.
WILLEM BAKKER
BY

ATTORNEY

May 16, 1967  W. BAKKER  3,319,409
METHOD AND DEVICE FOR SECURING YARN PACKAGES
Filed Aug. 11, 1964  8 Sheets-Sheet 7

INVENTOR.
WILLEM BAKKKER
BY

ATTORNEY

May 16, 1967  W. BAKKER  3,319,409
METHOD AND DEVICE FOR SECURING YARN PACKAGES
Filed Aug. 11, 1964  8 Sheets-Sheet 8

INVENTOR.
WILLEM BAKKER
BY

ATTORNEY

United States Patent Office 3,319,409
Patented May 16, 1967

3,319,409
METHOD AND DEVICE FOR SECURING YARN PACKAGES
Willem Bakker, Velp, Netherlands, assignor to American Enka Corporation, Enka, N.C., a corporation of Delaware
Filed Aug. 11, 1964, Ser. No. 388,872
Claims priority, application Netherlands, Aug. 28, 1963, 297,243
8 Claims. (Cl. 57—34)

This invention relates to a method of producing a bobbin-wound yarn package and more particularly to a method of securing the leading and trailing threads of a yarn package. The invention also relates to a thread fixation device for securing the thread ends of a yarn package.

Conventionally, yarn packages are provided with a leading and trailing thread end or transfer tail. These thread ends are used to provide a continuous thread supply, as in beaming operations, and are normally secured to the support bobbin after preparation of the yarn package. The leading thread and the transfer tail are secured in a manner so as to prevent their unwinding, getting dirty, becoming frayed, becoming difficult to locate among the windings of the package, and to provide easy access by subsequent users of the package.

Several methods of securing these thread ends have been previously used. The ends may be taped to the inside or outside edge of the package bobbin; they may be glued to the lower end of the bobbin; the bobbin may be provided with mechanical grooves or slots to which the threads may be fastened. All of these methods have the disadvantage of requiring a manual operation to secure the ends of the package. This manual operation is a time-consuming one for the machine opeartor who prepares the yarn package.

Satisfactory results are particularly difficult to realize using such methods if the yarn package is formed on a drawtwister. This is an apparatus for drawing, twisting, and packaging yarns manufactured from synthetic polymers. In such cases the yarn ends must be fixed so that no undrawn sections of yarn form the transfer or initial thread ends. Moreover, when it is necessary to change bobbins on a drawtwister, it is desirable to keep the yarn twisted on the machines. This makes it particularly difficult to carry out doffing of the packages when manual fixing of the thread ends is required.

Additional care must be taken to insure that the thread ends have been severed prior to removal from a drawtwister. In the standard drawtwister, a waste collection spool is located beneath the bobbin which is to receive the yarn. The yarn is applied to the bobbin by means of a radially disposed traversing ring twister which is brought to the waste spool position prior to doffing. If the yarn package ends are not severed prior to doffing, the waste yarn will be pulled from the waste spool and cause clogging of the drawtwister spindle. Several methods of providing fixation of package ends on a drawtwister have been suggested by co-pending applications Serial Nos. 326,520, filed Nov. 27, 1963, and 329,685, filed Dec. 11, 1963, and now U.S. Patent No. 3,263,409, which are commonly assigned with this application.

The present invention has for an object to provide a method of fixing a transfer tail and initial thread length to a yarn package which does not possess the aforementioned disadvantages.

A specific object of this invention is to provide an automatic method of securing yarn package ends to a bobbin during doffing operations from a drawtwister.

Another object of this invention is to provide unique thread fixation devices for securing thread ends to a supporting bobbin.

It is another object of the present invention to provide a yarn package and support bobbin in which the initial thread end and transfer tail are fixed entirely, simply, and efficiently by machine.

Other objects and advantages of the present invention will become apparent from the following detailed description and drawings.

The invention consists of providing thread fixation means on the base of a yarn package bobbin in such a manner that the leading and trailing edges of the yarn package are automatically gripped, secured, and severed during the doffing of the bobbin from the drawtwister. The securing of the leading and trailing ends occurs simultaneously during the axial movement of the bobbin on the rotatable spindle of the drawtwister. This axial movement occurs during doffing of the yarn package by the operator.

The rotatable twisting spindle of this invention consists of a bobbin receiving spool located above a waste spool and separated from the waste spool by a circular collar having a pair of circumferential grooves. These grooves provide contact points for the yarn as it passes from the waste spool to the collecting bobbin and returns to the waste spool after formation of the yarn package on the bobbin. These contact points establish the transfer tail and initial tail length of the yarn. A thread fixation member is provided at the base of the bobbin intermediate the collar contact points, and this fixation member grips the threads held by the contact points during axial movement of the bobbin, thereby securing the threads and severing the same during removal of the bobbin from the twist spindle. When both the transfer tail and the initial thread length are secured in this way, the operator need not be bothered by the thread ends during doffing. The only manual operation involved is the removal of the yarn package from the twist spindle. Cutting the threads connecting the yarn package with the waste spool is not necessary.

The contact points or notches on the radial collar consist of oppositely directed helical grooves which run oblique to the axis of the twisting spindle and are positioned relative to each other at an angular displacement, preferably about 180°. In one notch is laid or caught the thread connecting the initially laid waste bundle with the transfer tail, and in the other notch is laid or caught the thread connecting the waste bundle with the initial thread end. During the winding operation, the connecting threads are automatically caught in the respective notches. In this way when the formed package is being removed from the winding machine, the two connecting threads are tightened and broken between the notches in the circular collar. Since the connecting threads are retained on the twisting spindle by the collar, no yarn is pulled off the waste spool when the yarn package is removed. The short thread ends left on the twisting spindle after breaking do not get clamped between the replacing bobbin and the spindle. They extend radially outwards due to the centrifugal force and are covered by fresh windings laid on the waste spool when the traversing process is again started.

Moreover, with the present method, fully automatic removal of a finished yarn package from the machine can be accomplished. Irrespective of whether the yarn has S or Z twist, use may be made of the same bobbin and thread fixing means. It is now possible to finish large numbers of yarn packages in an entirely uniform manner, which is a considerable advantage in the further processing of the package. Replacing completed packages by empty bobbins takes up less time and the winding machine is idle for shorter periods. Using the method according to the invention makes it possible to wind many different packages from a single spinning point without any difficulties.

In the normal operation of a drawtwister of the aforementioned type, the ring rail initially is raised from a starting position in which the ring is opposite a waste spool on the twisting spindle below the yarn bobbin and lower limit of its normal traverse stroke. As the ring is raised, the thread passes over the edge of the circular collar and is caught in one of the notches on the rim of the collar. During the movement of the ring to the normal bobbin traverse position, a few windings forming a transfer tail are laid on the base of the bobbin. The ring rail thereafter is caused to traverse the bobbin, laying on windings until a yarn package is formed. The ring is then removed to a point below its normal traverse stroke adjacent the waste spool. This movement again lays several windings on the base of the bobbin, and passes the thread over the collar where it is caught in the other notch in the outer rim of the collar. The threads held by the notches in the collar and connecting the waste bundle with the yarn package contact the base of the bobbin just above a thread fixing device mounted in the end of the bobbin. As the bobbin is raised during doffing, the windings on the base of the bobbin slip down into the fixing device due to the retention of the connecting threads in the notches of the collar. Further axial movement of the bobbin causes the thus secured threads to be broken between the thread fixing device and the notches on the collar.

The invention will be further elucidated by means of the drawings, in which several embodiments are shown.

FIGURES 7–10 show two modifications of the fixation device.

Figure 1:
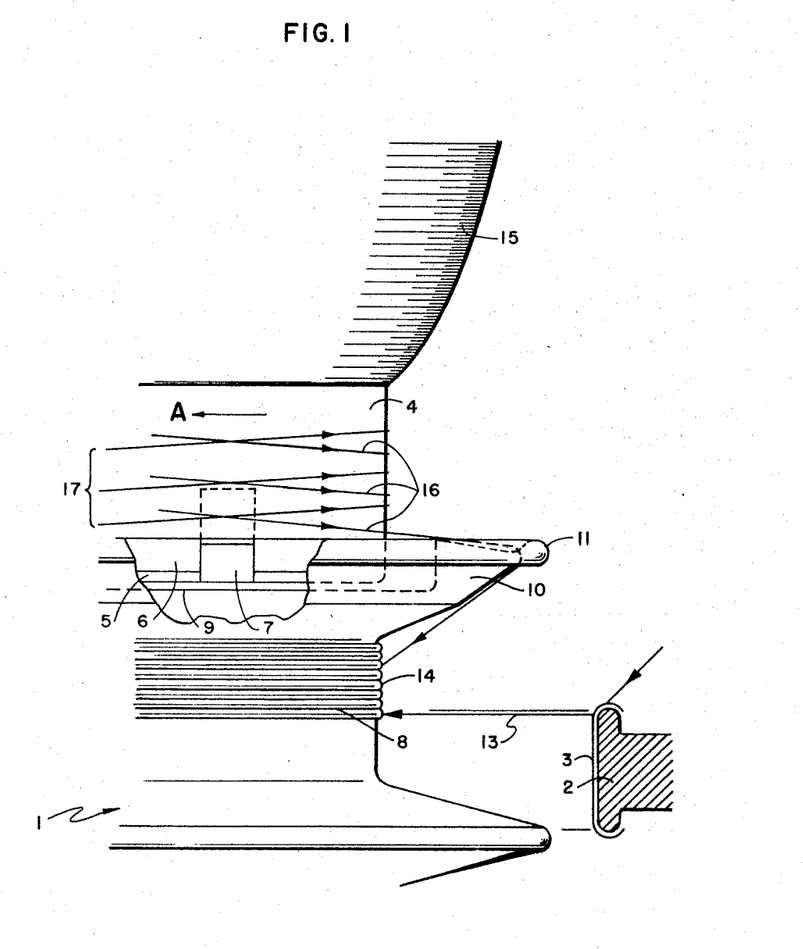
FIGURE 1 shows a yarn package on the twisting spindle.
Figure 4:
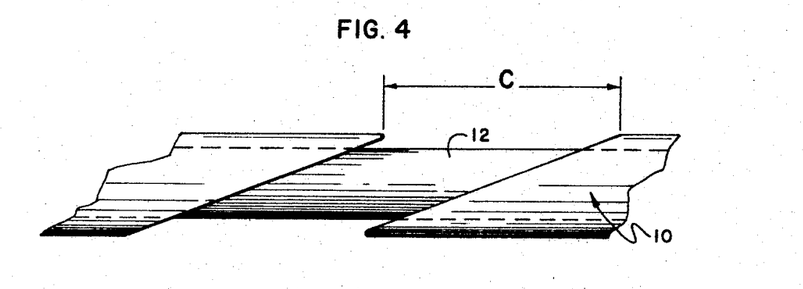
FIGURE 4 is a side view of a notch in the twisting spindle.
Figure 12:
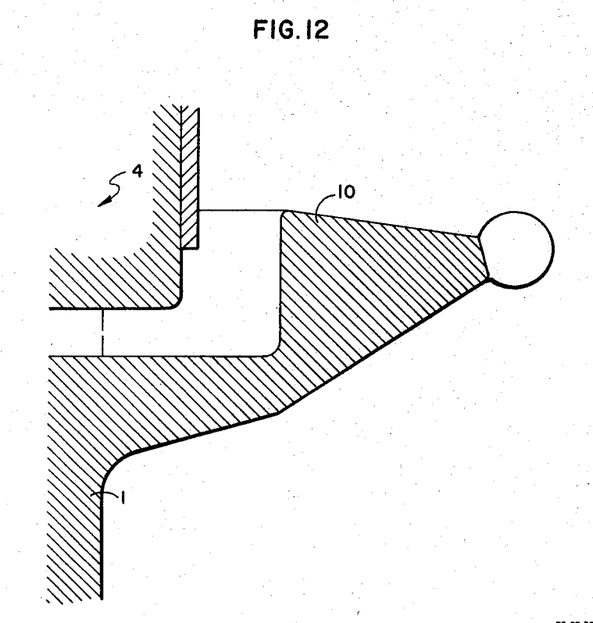
FIGURE 12 shows, on a larger scale, the shape of the collar on the twisting spindle.

Referring to the drawings, FIGURE 1 shows a twisting spindle 1 of a conventional drawtwisting machine having the usual twisting ring 2 and traveller 3 movable thereon. On the engaging surface of the spindle 1, there is placed a bobbin 4 provided with cooperating engaging surfaces, which bobbin consists of an inner tube 5 and an outer tube 6. Between the inner and the outer tube there is inserted a thread fixation device 7 which is shown on a larger scale in FIGURES 5 and 6. The spindle 1 comprises a portion 8 which serves as an auxiliary or waste spool. Below the waste spool 8 the spindle is driven in known manner by means of a belt (not shown). At the level of the recessed bobbin supporting surface 9, the spindle 1 is provided with a collar 10, which has a diameter greater than that of the bobbin 4 and waste spool 8. The collar is rounded at its outer circumference, as shown on a larger scale in FIGURE 12. Collar 10 is provided with two notches 11 and 12 which are spaced 180° apart and run along a left hand and a right hand helix, respectively. One of the notches is shown on a larger scale in FIGURE 4. The width of the notch in the direction perpendicular to the helix along which it runs is not more than a few millimeters, for instance 2 mm., and the longitudinal axis of the notch (tangent to the helix) makes an angle of 70° with the longitudinal axis of the twisting spindle. This provides a proper width C for catching the threads, and there is no chance of injury when touching the rotating spindle with the hand.

FIGURE 1 shows the position of the equipment at the end of the winding process, with the ring 2 in its lowest position and the yarn 13 being laid on the waste spool 8. During operation the spindle rotates in the direction indicated by the arrow A. After an empty bobbin 4 has been placed on the spindle 1, the latter is started up, the yarn 13 being wound from the ring 2, which is in its lowest position, onto the waste spool 8. These windings constitute a bundle of waste yarn 14. Shortly after the spindle 1 has been started up, the ring is raised towards the normal traversing zone for the winding of a package 15 containing, for instance, about 1000 grams of yarn. While the ring is being raised, the yarn is wound along a right hand helix, passes over the collar 10 and is caught by the notch 12, which also runs along a right hand helix. On the bottom end of the bobbin 4 a few steep windings 17 are laid, forming the transfer tail. After completing the winding of the package 15, during which the twisting ring is traversed up and down the height of the bobbin in a definite program, the ring is lowered below the normal traversing zone into the initial position shown in FIGURE 1. During this lowering movement a few steep windings 16, which form the initial thread length are laid on the bottom end of the bobbin 4 so that they run along a left hand helix. The descending thread, as it passes the collar 10, is caught by the notch 11, which also runs along a left hand helix. As soon as the ring 2 has reached its lowest position, the machine is stopped.

Figure 2:
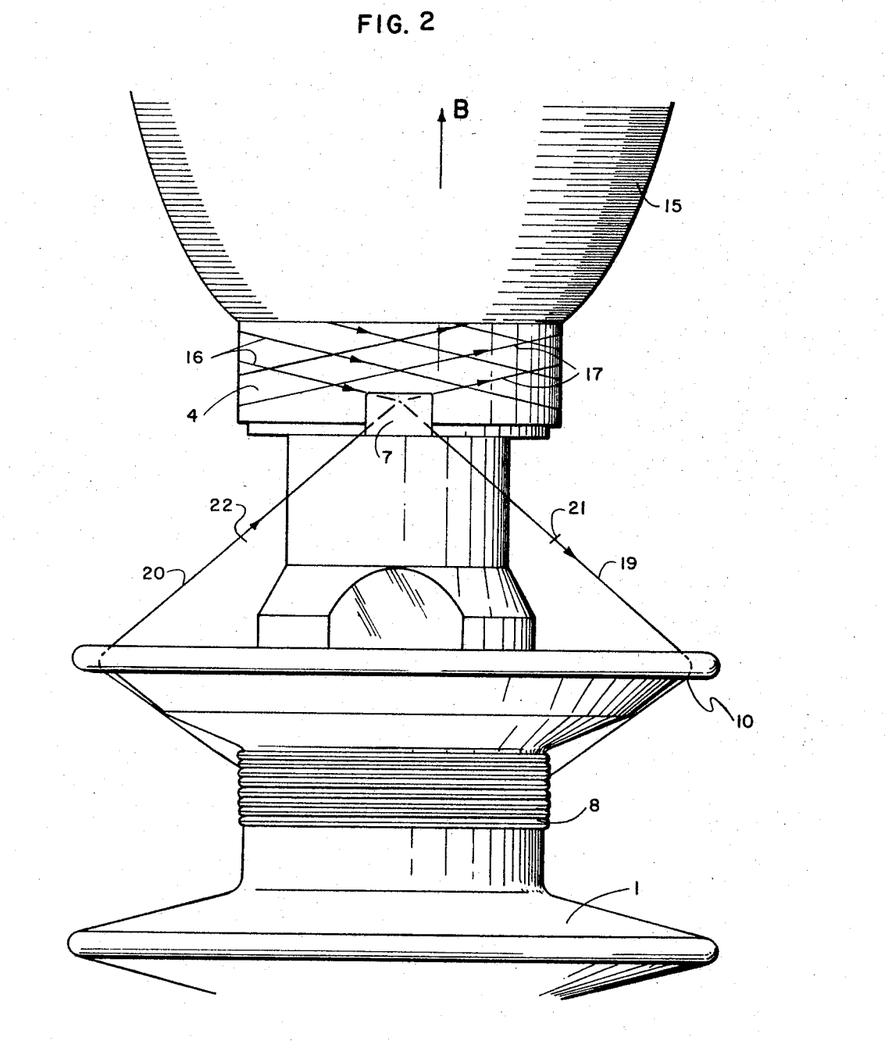
FIGURE 2 shows a yarn package partially removed from the twisting spindle.

After the machine has been stopped, the yarn package 15 may be removed from the spindle 1. When the package is raised in the direction of the arrow B (see FIGURE 2), the transfer tail 17 and the initial thread length 16 slide downward over the bobbin surface, since they are held in the notches 12 and 11, respectively. The notch 12 forms the contact point where the yarn leaves the twisting spindle and runs to the bobbin; and the notch 11 forms the contact point where the yarn again reaches the spindle after it has left the bobbin. In the embodiment shown in the FIGURES 1 to 3 these contact points are spaced 180° apart and are at an angular distance of 90° from the fixation device 7. When the threads slide downwardly over the bobbin surface, they are clamped between the inner surface 18 (see FIGURES 5 and 6) of the fixation device 7 and the bobbin surface. After the transfer tail and the initial thread length have been clamped under the fixation device 7, the threads 19 and 20 connecting the yarn package with the twisting spindle 1 are, as the yarn package is raised further, broken at the points 21 and 22. After the connecting threads have been broken, the yarn package is immediately ready for subsequent handling, both ends of the thread being firmly secured to the package bobbin. During the upward movement of the yarn package the fixation device 7 is kept at practically the same angular distance from the contact points 11 and 12, and no yarn is pulled off the waste spool 8. When use is made of the fixation device 7 shown in FIGURES 5 and 6, the transfer tail and the initial thread length are entirely free from the fixation device prior to the upward movement of the yarn package. If desired, two fixation devices may be provided on the bobbin. One device may then serve to secure the transfer tail, and the other to secure the initial thread length, as will be explained presently.

Figure 3:
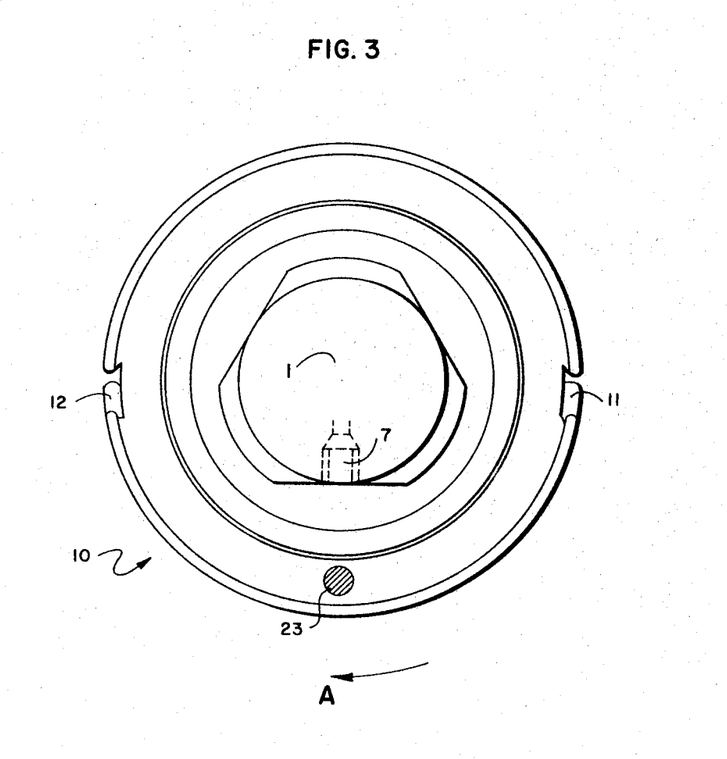
FIGURE 3 shows the twisting spindle in a plan view.

FIGURE 3 shows a positioning mark 23 on the collar 10 opposite which is to be placed the fixation device 7 on the bobbin.

Figure 5:
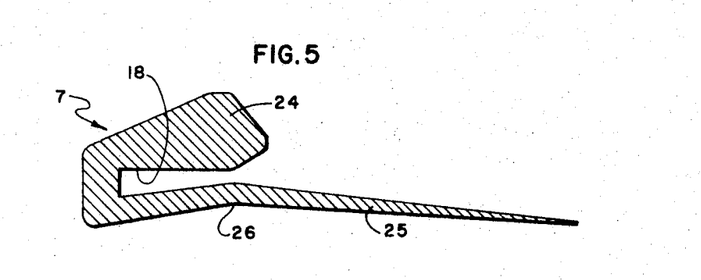
FIGURE 5 shows a fixation device in section.
Figure 6:
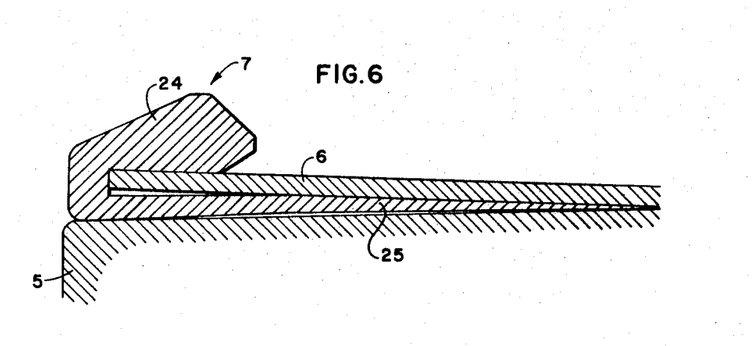
FIGURE 6 shows the device of FIGURE 5 after it has been placed on a bobbin.

In the FIGURES 5 and 6 the fixation device 7 is shown on a larger scale and consists of a short, relatively rigid leg 24 with inner surface 18 and a longer, less rigid tapered leg 25. The legs are rigidly connected at one end to form a J-shaped element. At the point of the bend 26 in the long leg the distance between the legs is smaller than the wall thickness of the outer tube 6. When the long leg 25 of the J is inserted between the inner tube 5 and the other tube 6, the inner surface 18 is clamped on the bobbin surface (see FIGURE 6). If desired, the fixation devices may be mounted on the bobbins by machine. In order that the inner surface 18 may retain the threads properly, it may, for instance, be covered with rubber or short-pile bristles, be provided with ridges, or have other surface characteristics which would grip the thread ends.

Figure 7:
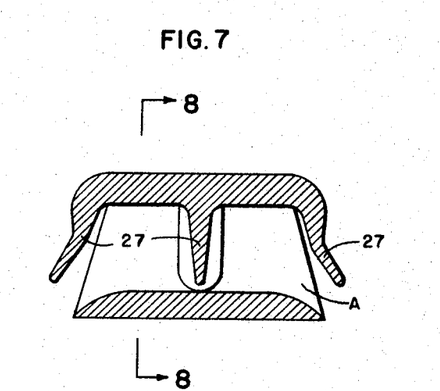
FIGURES 7 and 8, which are sectional views of each other, show a fixation device having tapered ribs.
Figure 8:
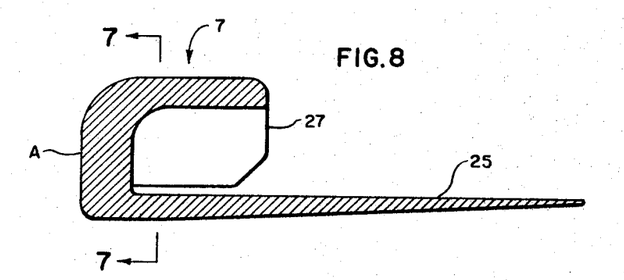

FIGURES 7 and 8 show a fixation device of the same general type as that shown in the FIGURES 5 and 6, except that the inner surface of the fixation device is provided with a number of ribs 27 which extend in the axial direction of the bobbin, which ribs taper at their ends and may readily be bent and clamped on the bobbin. Tapered leg 25, again, as in the structure identified in FIGURES 5 and 6, is shaped like a J to facilitate the devices insertion between an inner and outer layer of a bobbin. FIGURES 7 and 8 are sections along the lines 7—7 and 8—8 of the respective figures. A represents the heel segment of the fixation device which is integral to leg 25.

Figure 9:
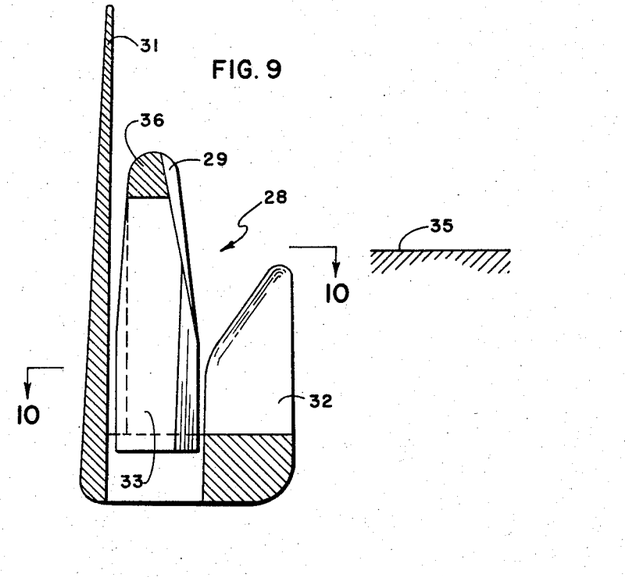
FIGURES 9 and 10, also sectional views of each other, show a somewhat different fixation device in which thread ends are gripped between elements of the device itself.
Figure 10:
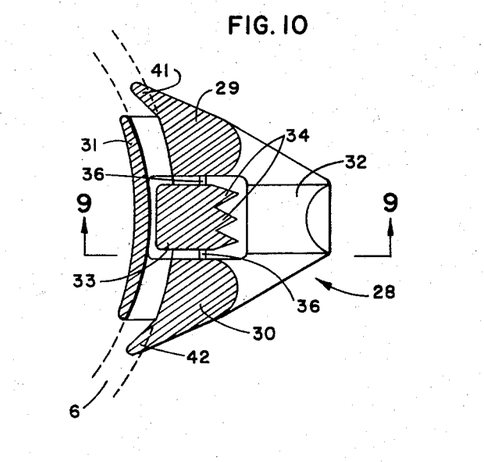

The FIGURES 9 and 10 shows a fixation device 28 of a somewhat different type in section along the lines 9—9 and 10—10, respectively. This fixation device 28 comprises two guiding ribs 29 and 30 which are separated from each other and lie on the bobbin surface when the lip 31 is inserted between the inner tube 5 and the outer tube 6. Between the guiding ribs and the clamping rib at their free ends are provided bevelled surfaces. Opposite the clamping rib 32 and between the guiding ribs there are clamping means in the form of a tongue 33 with teeth 34. The guiding ribs 29 and 30 are at their sides provided with lips 41 and 42 which ensure that device 28 is securely attached to the bobbin 4. In this way the fixation device is prevented from becoming detached from the bobbin during the removal and subsequent handling of the yarn package 15.

The guiding ribs 29 and 30 and the clamping rib 32 are so positioned that after the bobbin has been placed on the twisting spindle, the two guiding ribs project above the collar 10 of the spindle 1 while the clamping rib does not. In FIGURE 9 the level of the top edge of the collar 10 relative to the fixation device 28 is indicated by the line 35. If the appropriate length is chosen for the guiding ribs, the transfer tail and the initial thread length are already on the guiding ribs at the end of the winding process and before the axial movement which takes place when the yarn package is removed from the twisting spindle. At points 36 tongue 33 is connected to the free end of the guiding ribs. When the fixation device 28 is not on a bobbin, the distance between the tongue 33 and the lip 31 is smaller than the wall thickness of the outer tube 6. When the fixation device 28 is slipped on a bobbin, the tongue 33 with its teeth 34 is forced against the clamping rib 32, and the connections 36 between the tongue and the guiding ribs are displaced by the end of the bobbin.

Figure 11:
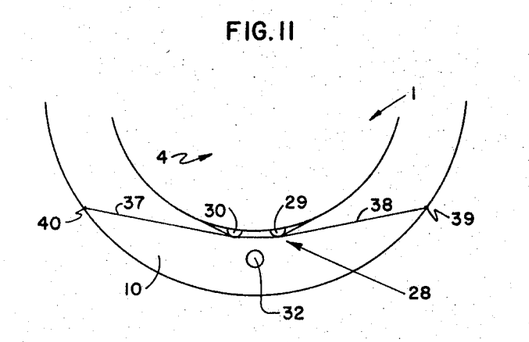
FIGURE 11 shows the positions of the notches in the spindle when use is made of the fixation device shown in the FIGURES 9 and 10.

FIGURE 11 shows schematically, in plan view, the twisting spindle 1 with collar 10 on which there is placed a bobbin 4 with a fixation device 28 of the type shown in the FIGURES 9 and 10. Only the guiding ribs 29 and 30 and the clamping rib 32 are indicated. Threads 37 and 38 connect the transfer tail and the initial thread length (not shown) with the waste spool. The distances between the ribs 29, 30, and 32 are not shown to scale in order to illustrate that, during use of the fixation device shown in the FIGURES 9 and 10, the angular distance from the notches 39 and 40 in the outer circumference of the collar 10 to the fixation device is different from that used in the case of the fixation device 7 shown in the FIGURES 5 to 8. Connecting threads 37 and 38 are placed so that they lie in the triangle formed by the ribs 29, 30, and 32. When the package is removed from the spindle the threads slip over the guiding ribs 29 and 30 and are subsequently clamped between the clamping rib 32 and the tongue 33. With the usual dimensions of the bobbin 4 and the collar 10, for instance a bobbin diameter of about 50 mm. and a collar diameter of about 80 mm., the angular distance from the notches 39 and 40 to the fixation device 28 will be small, so that after the connecting threads have been broken only short pieces of thread will be left on the spindle.

Figure 13:
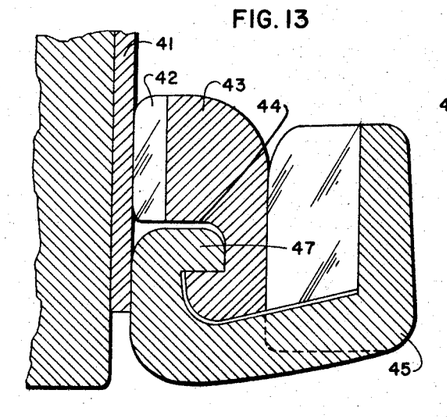
FIGURE 13 shows in section a slidable fixation device mounted on a ring which is clamped on the yarn bobbin.
Figure 14:
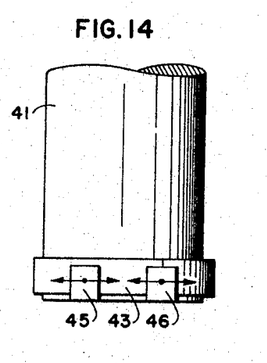
FIGURE 14 shows in side view two fixation devices with a ring according to FIGURE 13.

In the FIGURES 13 and 14, a modified fixation device is shown. A ring 43 is secured to the outer jacket 41 on the lower part of the yarn bobbin by means of teeth 42. Ring 43 has a circumferential groove 44 in which two fixation devices 45 and 46 are mounted by means of a hook-shaped arm 47. These fixation devices are slidably adjustable in the direction of the arrows to various positions on the circumference of the bobbin.

Figure 15:
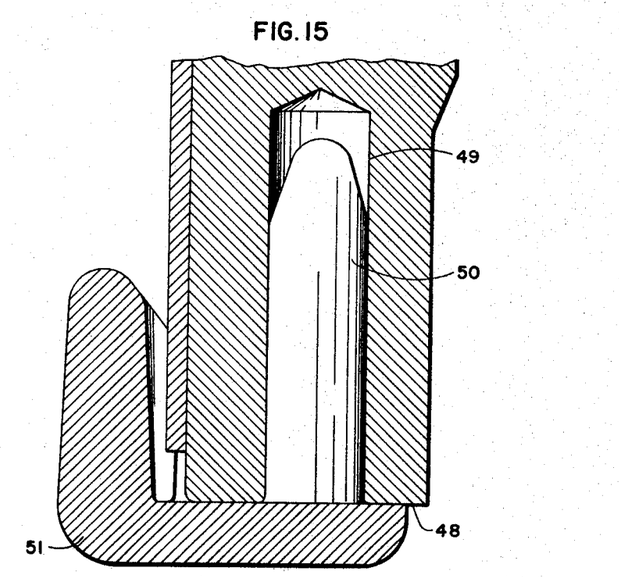
FIGURE 15 shows in section a yarn bobbin with a fixation device, which is mounted in an end surface of the bobbin.

In another modification shown by FIGURE 15, the end surface 48 of the yarn bobbin is provided with an axial bore 49, in which a tapered pin 50 of a fixation device 51 is clamped.

Within the scope of the invention other modifications are conceivable, and the invention is to be limited only by the extent of the following claims.

What is claimed is:

1. A method of securing the lead and tail ends of a yarn package whereby the yarn package may be more effectively handled during processing, comprising the steps of:
    (1) supplying a thread to a waste collecting spool located on a spindle adapted for rotation,
    (2) passing said thread from the waste collecting spool through a thread securing section comprising a portion of said spindle, and which is adapted for rotation,
    (3) collecting said thread into a yarn bundle, on a bobbin supported by said spindle,
    (4) then, passing said thread from the bundle again through the securing section of said spindle to the waste collecting spool thereof, and
    (5) thereafter stopping the spindle's rotation, and removing a yarn package therefrom and consisting of a yarn bundle on a bobbin having thread ends which are secured to said yarn package when severed from the waste spool.

2. A method of securing leading and trailing yarn ends to a yarn package consisting primarily of a yarn bundle on a bobbin and wherein said bobbin has a base portion below said yarn bundle to receive initial and subsequent yarn windings and as produced on a drawtwister a rotatable spindle with a waste collecting spood thereon, the steps comprising:
    (1) supplying thread to a reciprocating thread supply ring radially disposed about said spindle,
    (2) forming a waste bundle on said spindle,
    (3) reciprocating said supply ring to a position to lay a yarn bundle on said bobbin during said reciprocation,
    (4) passing said thread through securing means on said spindle and laying a plurality of thread windings on the base of the bobbin prior to the yarn bundle formation, (5) forming a bundle of yarn comprising a major portion of a yarn package,
(6) reciprocating said ring to a waste position to again lay a plurality of thread windings on the base of said bobbin, and
(7) gripping said windings to secure same to the base, said gripping occurring during removal of the bobbin from the drawtwister.

3. The method of claim 1 in which the yarn package is removed from the collection area along the axis of rotation in the zone.

4. A thread fixation device for use with a yarn collection bobbin to secure the initial thread end and transfer tail of the yarn, said device comprising a substantially J-shaped, flexible element in which the longer leg is tapered for insertion at the base of the bobbin and the shorter leg of the element has an inner gripping surface cooperating with the outer face of the bobbin to provide a thread receiving and securing means.

5. The device of claim 4 in which the longer leg is inserted between inner and outer cylinders of the bobbin.

6. The device of claim 4 in which the longer leg is inserted into an axial bore located in the end surface of the bobbin.

7. A yarn receiving bobbin having thread end fixing means located on the base thereof, said fixing means comprising a ring secured to the bobbin base and offset therefrom to provide a circumferential groove, hook-shaped projections in said groove, and a pair of circumferentially adjustable thread receiving elements attached to said ring by said hook-shaped projections in said groove.

8. A yarn bobbin having a fixation device for a transfer tail and initial thread length, said fixation device comprising two guiding ribs separated a distance from each other and lying on the surface of the bobbin, a clamping rib located intermediate the guiding ribs and spaced radially outward therefrom, and a clamping means located opposite said clamping rib and between the guiding ribs.

References Cited by the Examiner

UNITED STATES PATENTS 1,477,162  12/1923  Andrew _____________ 242—165

FOREIGN PATENTS 876,212  8/1961  Great Britain.

FRANK J. COHEN, *Primary Examiner.*

J. PETRAKES, A. J. SIDOTI, *Assistant Examiners.*